Sept. 2, 1947.   R. SONNENBERG ET AL   2,426,714
TUBE FORMING MACHINE
Filed Jan. 30, 1943        10 Sheets-Sheet 1

Rudolph Sonnenberg
Irvin L. Young
INVENTORS.

BY *Stearns & Batchelor*

ATTORNEYS.

Sept. 2, 1947.  R. SONNENBERG ET AL  2,426,714
TUBE FORMING MACHINE
Filed Jan. 30, 1943  10 Sheets—Sheet 2

Fig. 2.

Rudolph Sonnenberg
Irvin L. Young
INVENTORS.

BY *Stevens & Batchelor*

ATTORNEYS.

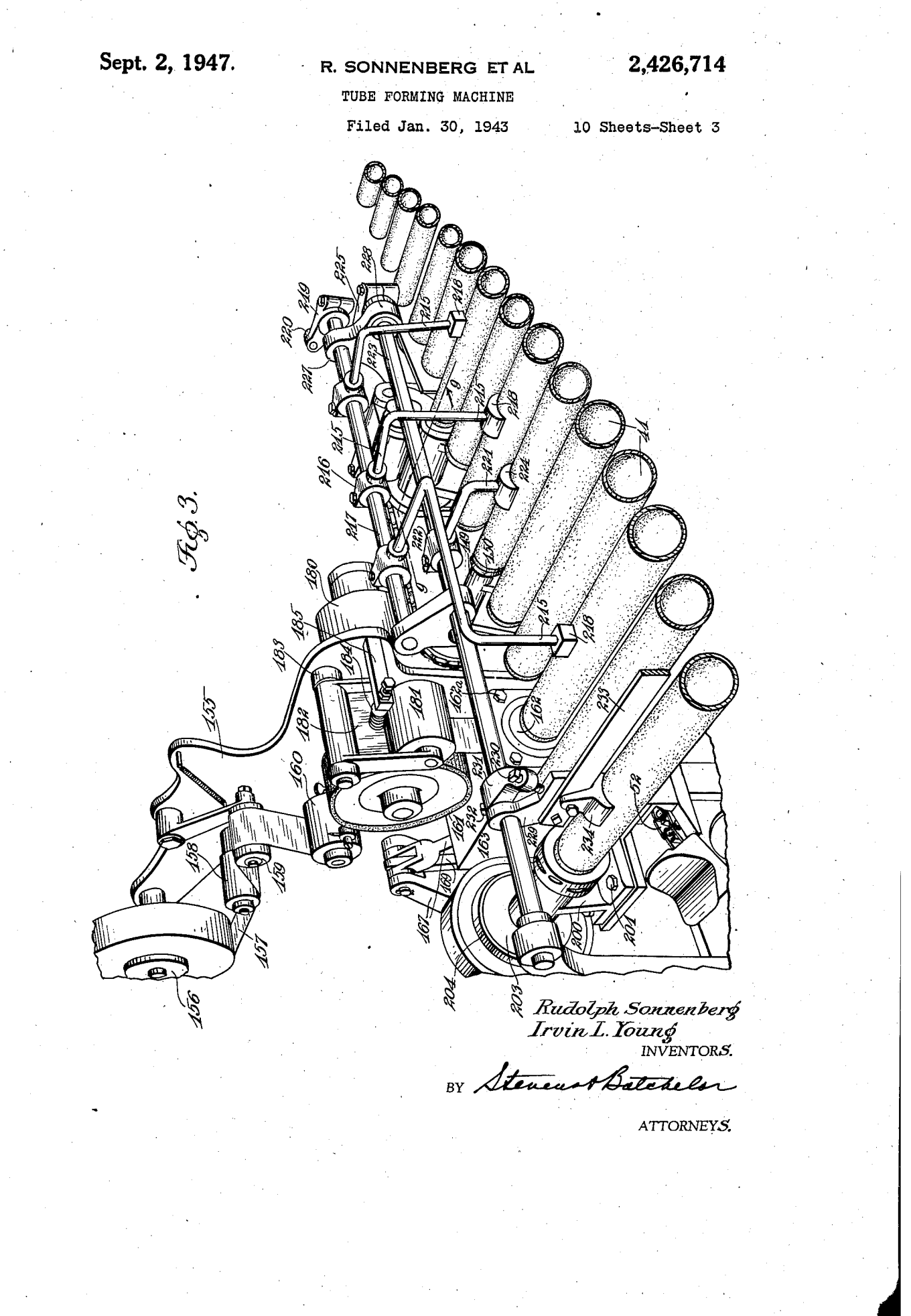

Sept. 2, 1947.  R. SONNENBERG ET AL  2,426,714
TUBE FORMING MACHINE
Filed Jan. 30, 1943  10 Sheets-Sheet 3

Fig. 3.

Rudolph Sonnenberg
Irvin L. Young
INVENTORS.

BY Stewart Batchelor

ATTORNEYS.

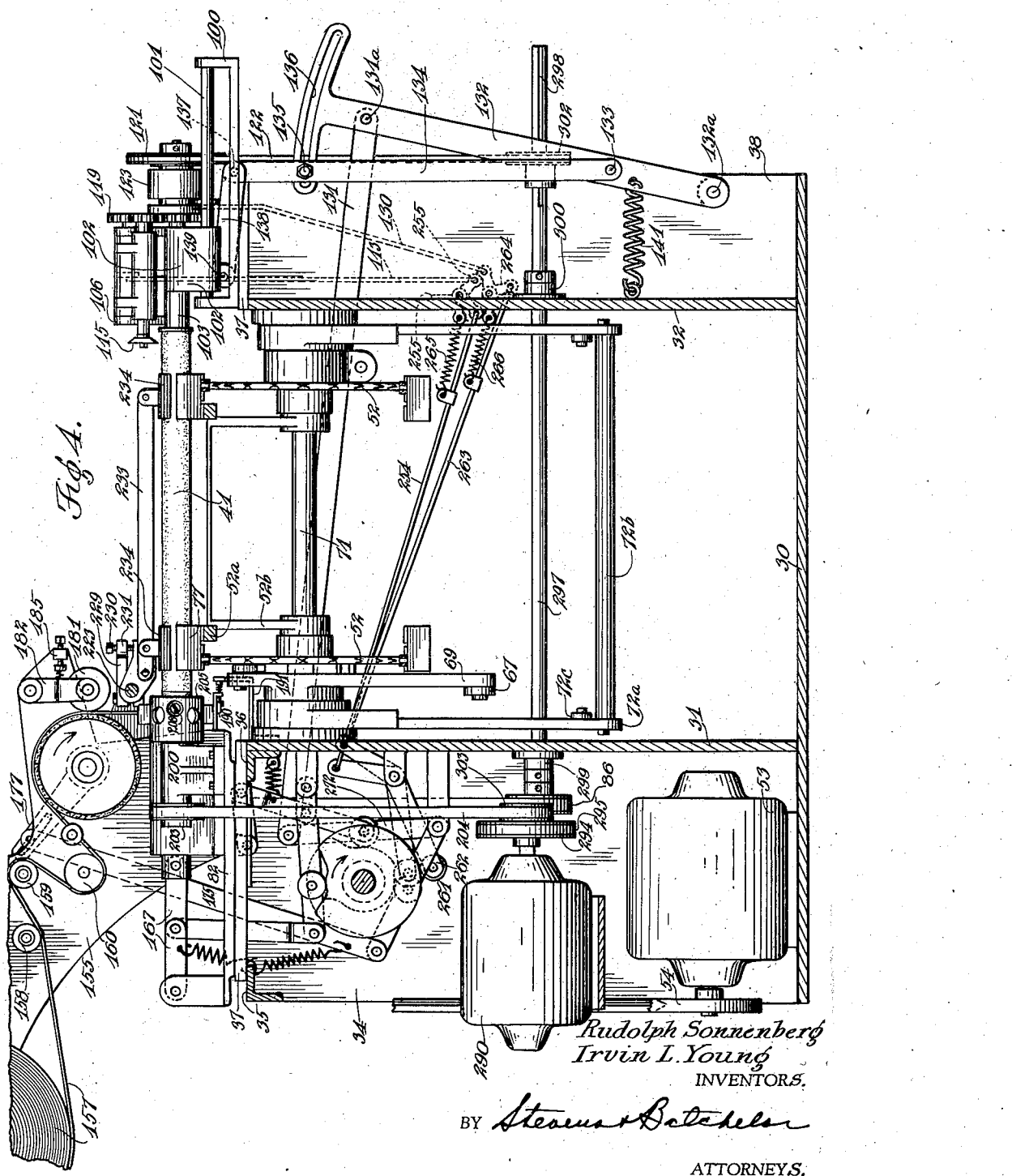

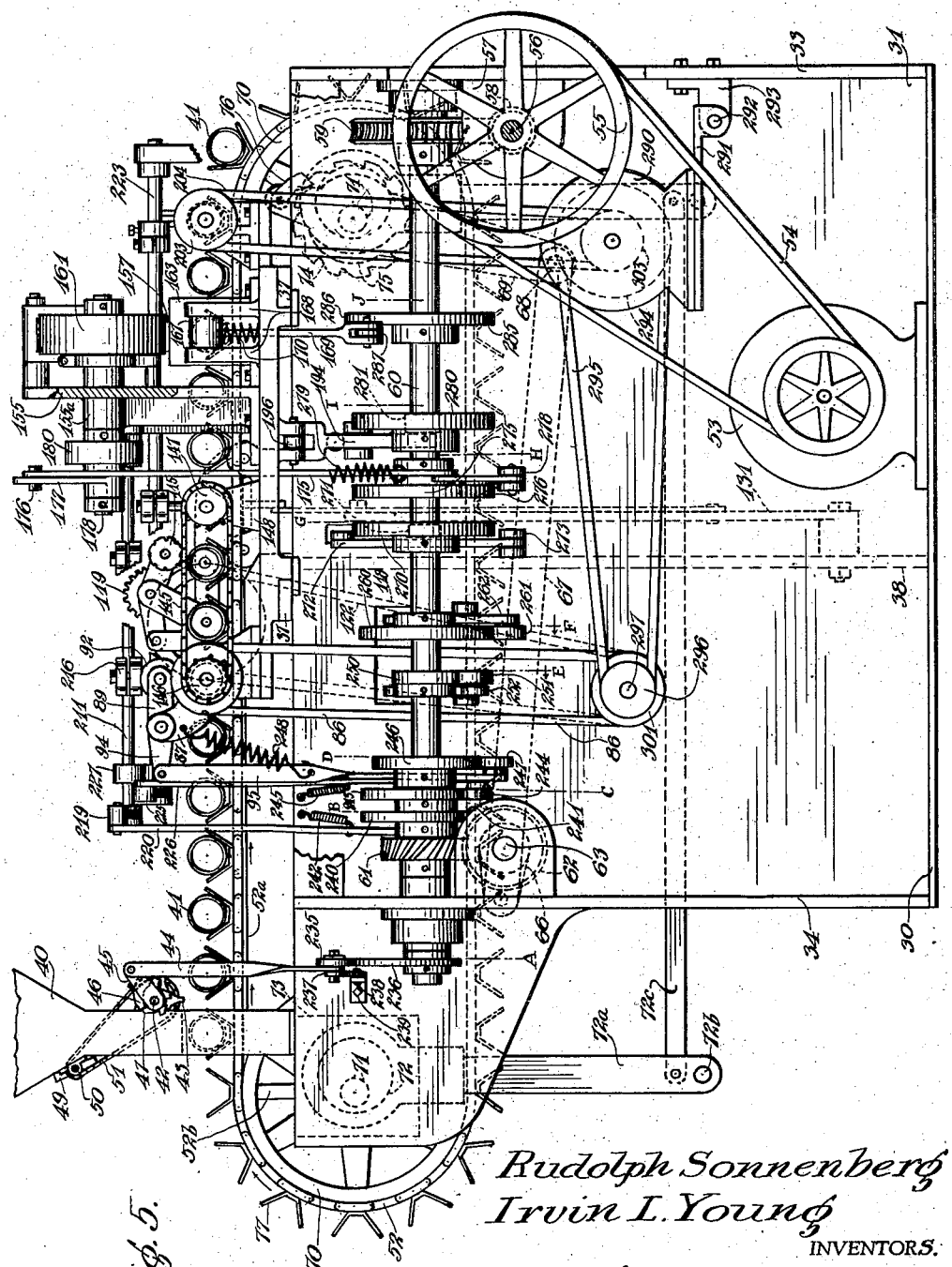

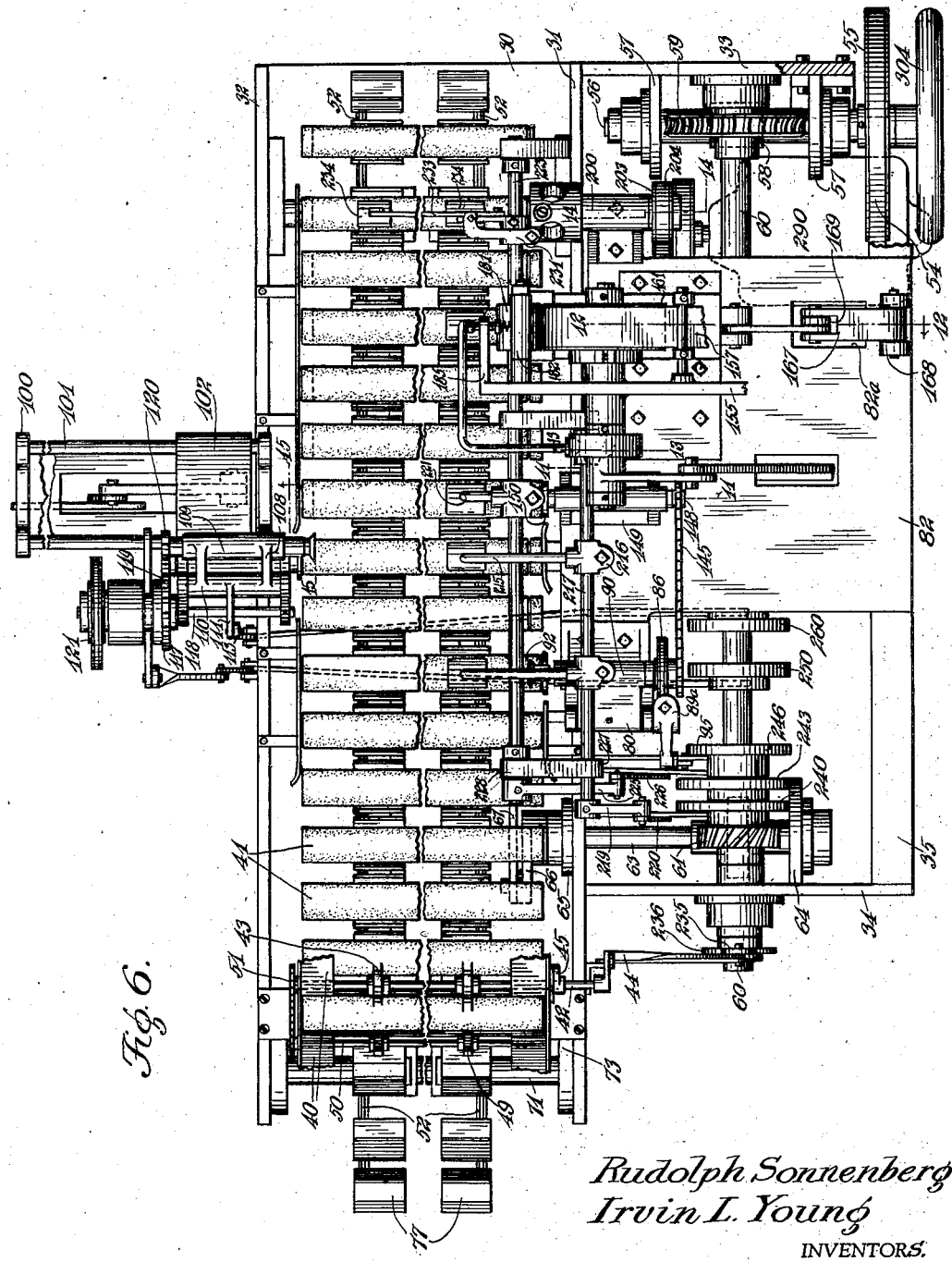

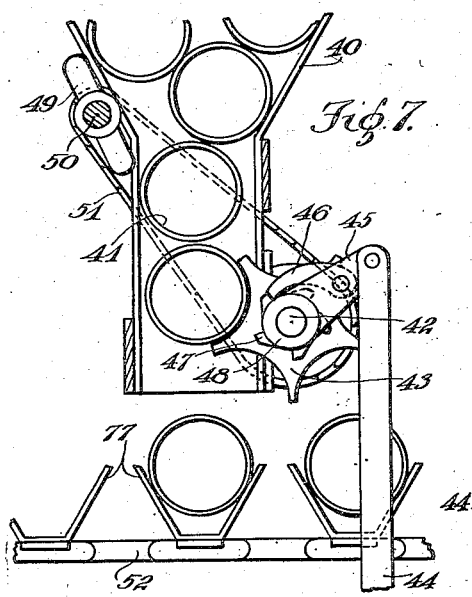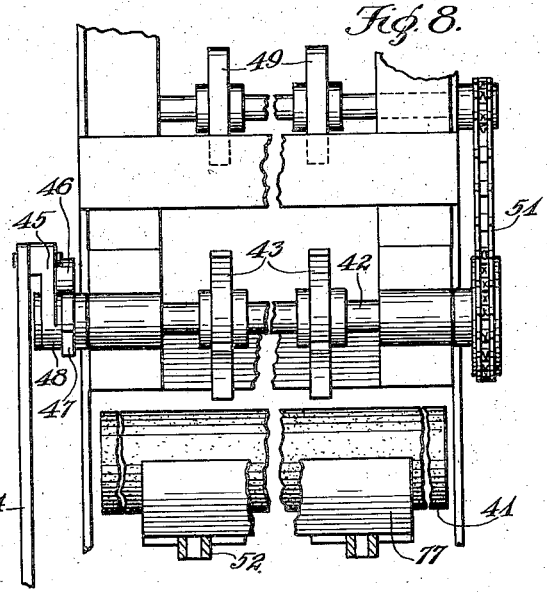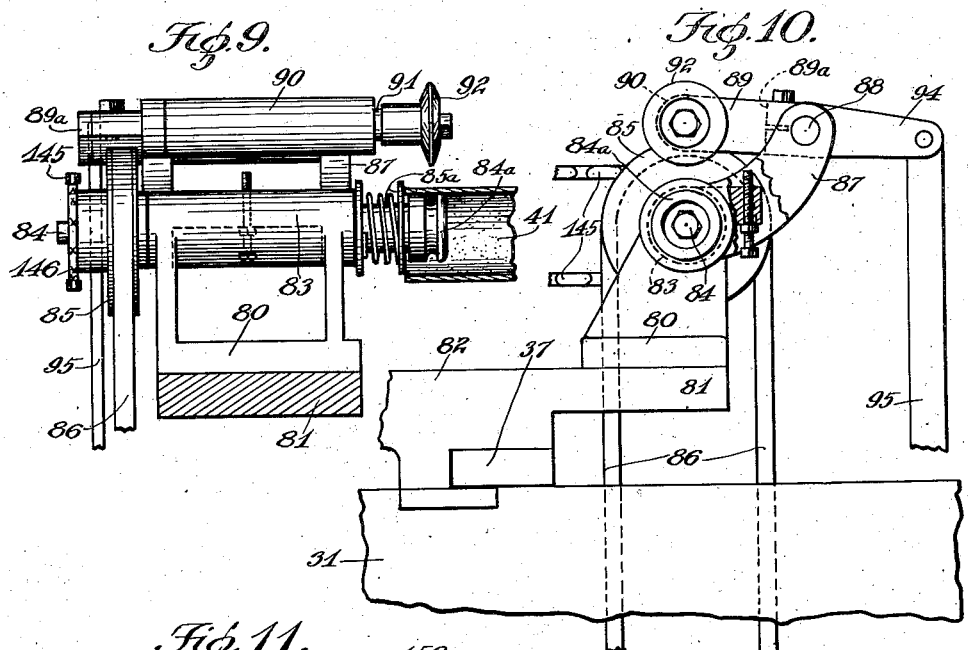

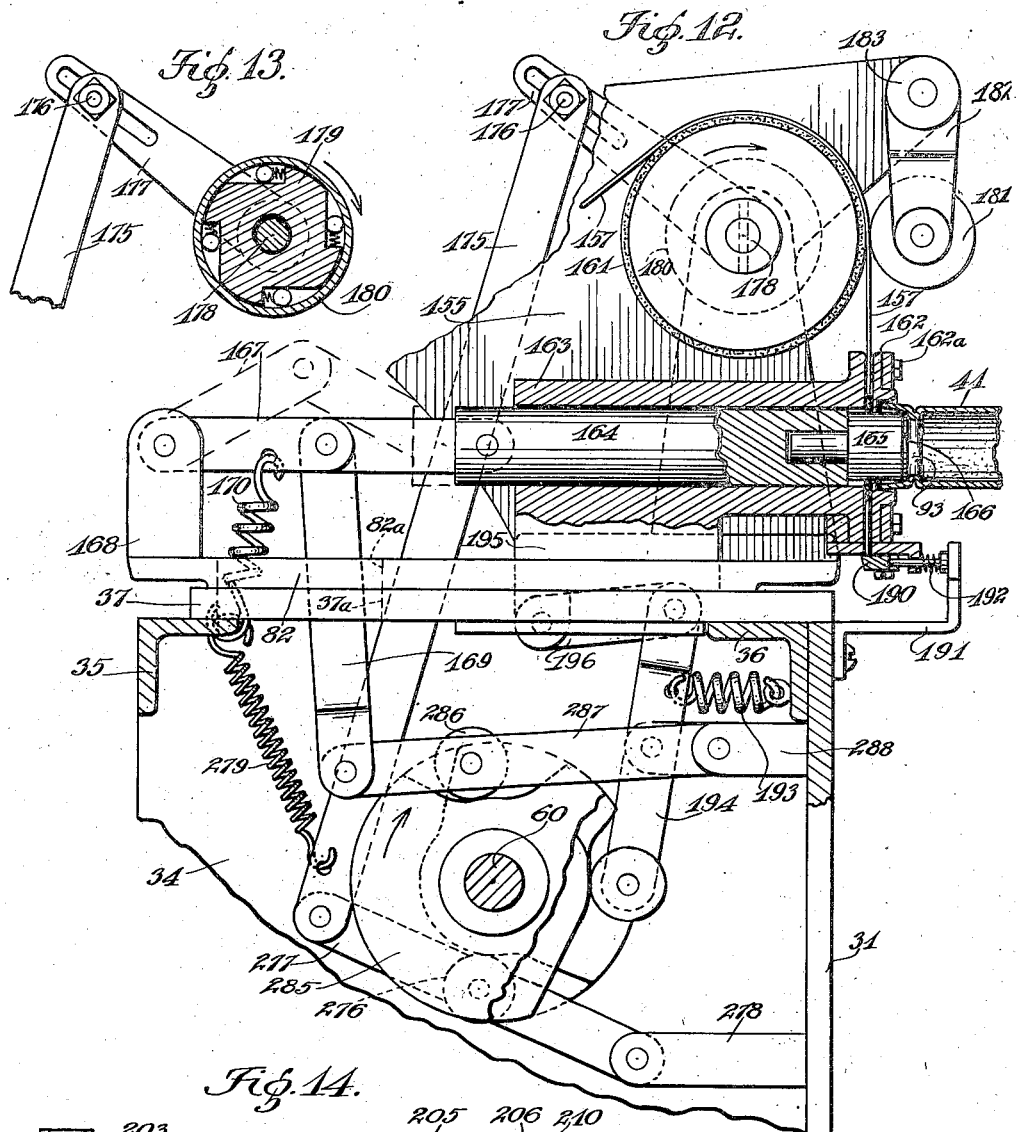

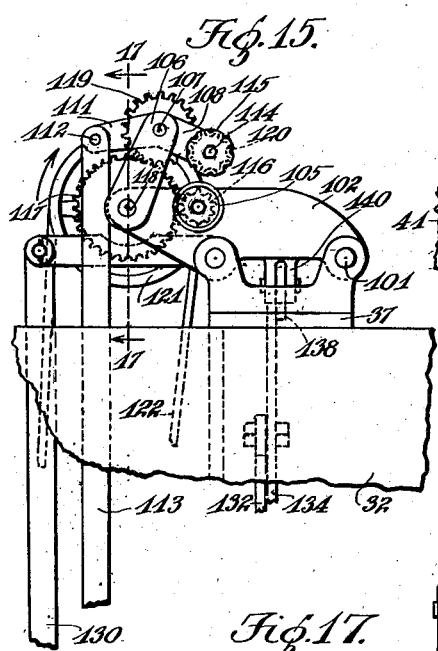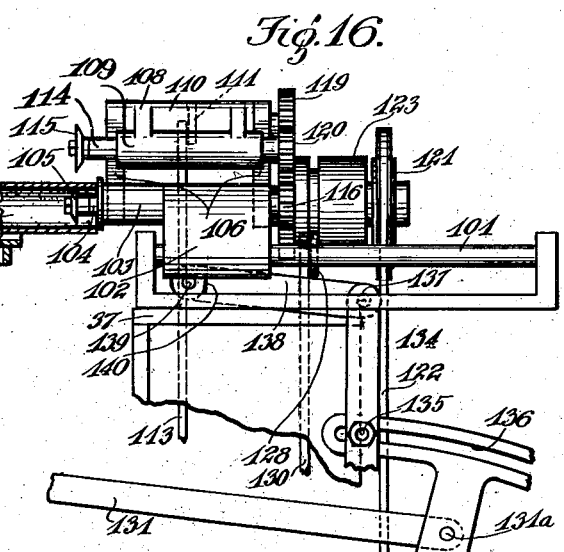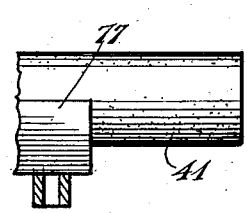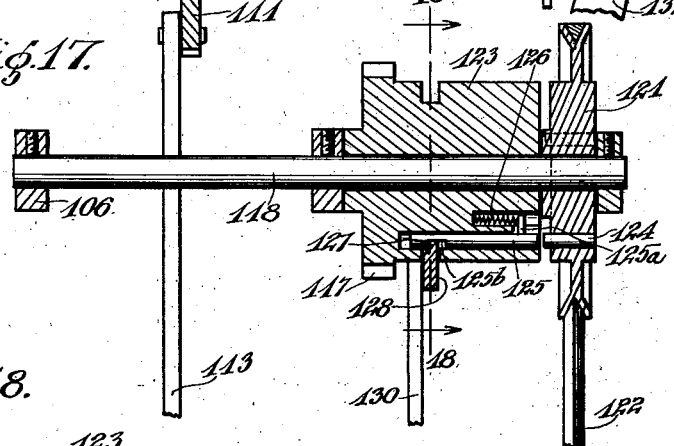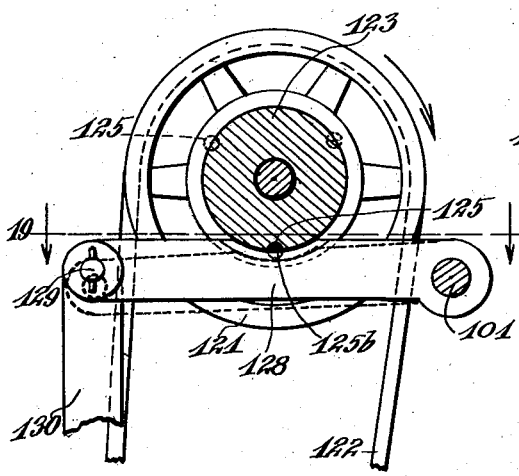
Rudolph Sonnenberg
Irvin L. Young
INVENTOR.

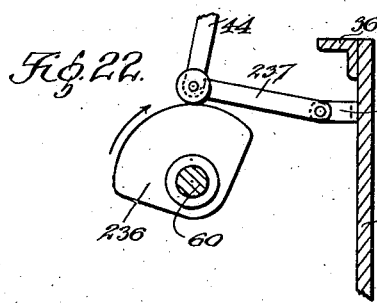
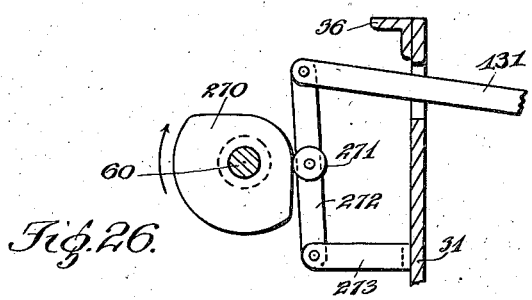
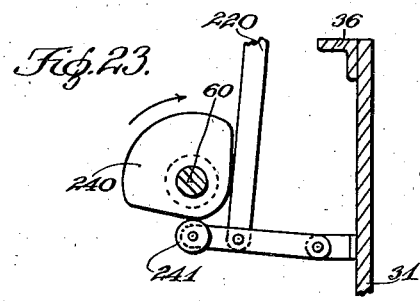
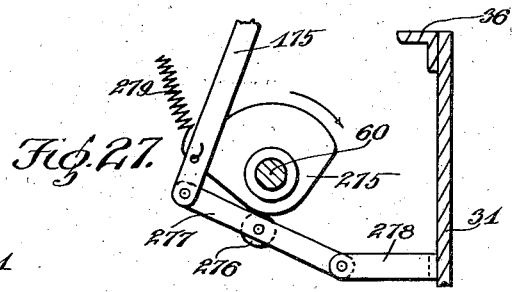
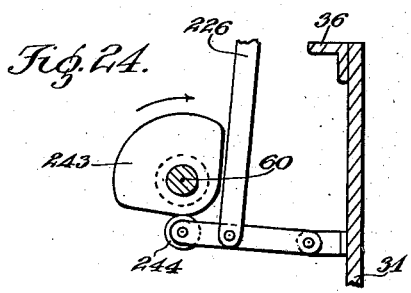
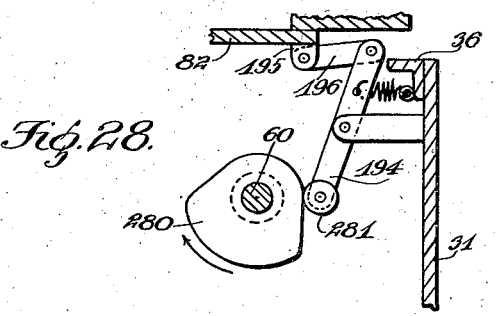
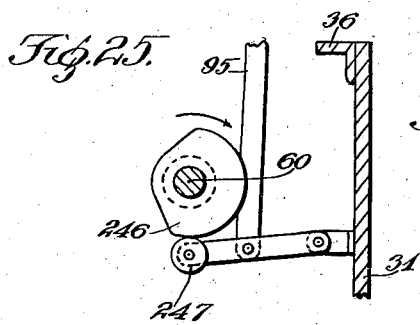
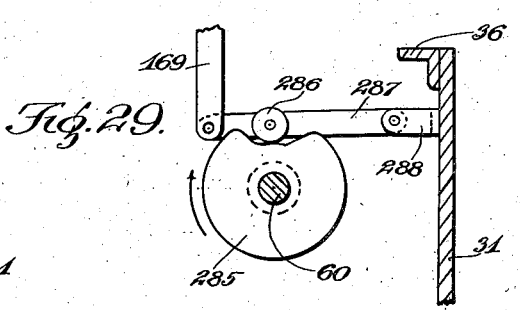

Patented Sept. 2, 1947

2,426,714

UNITED STATES PATENT OFFICE 2,426,714

TUBE FORMING MACHINE

Rudolph Sonnenberg, Belvidere, and Irvin L. Young, Chicago, Ill.

Application January 30, 1943, Serial No. 474,154

2 Claims. (Cl. 93—55.1)

This invention relates to pasteboard tubes of the type employed as containers for milk bottle caps, and more particularly to means to form the tubes to serve the special purpose.

The pasteboard tubes under consideration are usually about 2 ft. long and 2″ in diameter, and are intended to receive a considerable supply of the common pasteboard milk bottle caps in stacked succession. The caps all face in one direction, so that the foremost one shows the day for which it is to be used, such as Tuesday, Wednesday, etc., the practice in home delivery of milk being to date each bottle daily. Thus, after a tube has been filled with caps, the end opposite the foremost cap is provided with a Cellophane window, while the other end is closed. Thus, when such a tube has been delivered to the dairy, the day marked on the particular supply of caps is readily noted through the window, making it easy to choose or select the tubes.

The present invention has for one of its objects to provide a machine which prepares or alters the tubes from the original or open form to that which is suitable for filling them with caps. In other words, the machine primarily forms a closure at the window end of the tube and leaves the other end open to facilitate the filling thereof. However, the machine also prepares such other end which is closed by the cap manufacturer after the tube has been filled, in a manner to facilitate its easier removal at the dairy or place where the tube is opened for the removal of its contents.

Another object of the the invention is to provide a machine of the above character which first imposes an internal barrier in the form of an annular bead, the latter being positioned at a point where the window is to be set.

A further object of the present machine is to treat the opposite end of the tube by cutting a rotary series of slits or perforations in the tube at a point a short distance from such end, so that the portion beyond the perforations may be readily removed by hand.

Another object of the machine is to provide means for the supply and insertion of the Cellophane window in the first mentioned end of the tube and against the bead.

Another object of the machine is to provide means for forming an internal stop in the end of the tube beyond the window to hold the same against the bead.

An additional object of the machine is to provide a mechanism which only requires the initial deposit of the open tubes into a hopper or a like receptacle, such mechanism serving to move the tubes forward as fed and to impose the aforesaid formations on them.

An important object of the machine is to provide a mechanism which is automatic throughout, harmonious in its action, simple in construction, and capable of continuously delivering the tubes in a form to be ready for filling with the bottle caps.

With the above objects in view, and any others which may suggest themselves from the description to follow, a better understanding of the invention may be had by reference to the accompanying drawings, in which—

Fig. 2 is a frontal perspective view of the machine, showing protective casings A and B omitted in other views;

Fig. 3 is a magnified view of the upper left-hand portion of the machine, showing a series of the pasteboard tubes in succession.

Fig. 4 is a front elevation of the main portion of the machine;

Fig. 5 is a left-hand side view thereof;

Fig. 6 is a top plan view;

Fig. 7 is an enlarged elevation, partly in section, of the unit in the left-hand upper portion of Fig. 5;

Fig. 8 is a right-hand side view of Fig. 7;

Fig. 9 is a section on the line 9—9 of Fig. 3, partly in elevation;

Fig. 10 is a right-hand view of Fig. 9;

Fig. 11 is an enlarged section on the line 11—11 of Fig. 6, partly in elevation;

Figure 21:
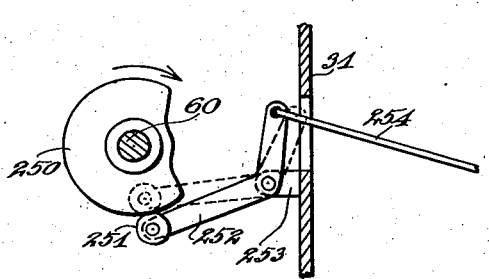
Figure 20:
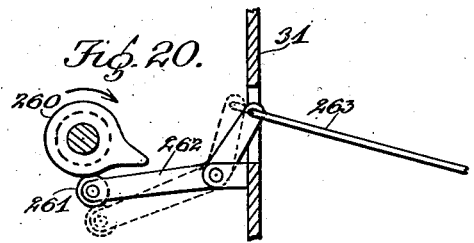

Figs. 12, 13, 14 and 15 are enlarged sections on the lines 12—12, 13—13, 14—14, and 15—15, respectively, of Fig. 6;

Fig. 16 is an enlarged duplication of the unit in the upper right-hand corner of Fig. 4, partly in section;

Fig. 17 is an enlarged section on the line 17—17 of Fig. 15;

Fig. 18 is a section on the line 18—18 of Fig. 17;

Fig. 19 is a section on the line 19—19 of Fig. 18;

Figs. 20 and 21 are sections on the lines F and E, respectively, of Fig. 5, and

Figs. 22 to 29 are, respectively, details of cam controls taken on the lines A, B, C, D, G, H, I and J of Fig. 5, and viewed in the left-hand direction.

In accordance with the foregoing, specific reference to the drawings indicates the base of the machine at 30, the same being at floor level. The frame of the machine is essentially composed of a pair of vertical plates 31 and 32 extending from front to rear, front and rear vertical plates 33 and 34 extending side-wise from the plate 31, inward top angle plates 35 and 36 extending between the plates 33 and 34, a top 37 mounted over the angle plates, and a vertical side plate 38 extending outwardly from the plate 32.

Figs. 2 and 5 show a typical hopper 40 of V shape in which a supply of pasteboard tubes 41 may be deposited from time to time for delivery to the machine. Figs. 7 and 8 show the lower portion of the hopper, and that the same carries a horizontal shaft 42 having a number of star-wheels 43 mounted thereon. As shown in Fig. 7, peripheral divisions of these wheels conform to the curvature of the tubes 41, and it is intended that the rotation of the shaft 42 in a counter-clockwise direction, according to Fig. 7, procure the downward feed of the tubes. The periodical rotation of the shaft is initiated by the vertical reciprocatory motion of a lever 44 having an arm 45 pivoted on the shaft 42, the arm having a pawl 46 directed to ratchet teeth 47 carried by a collar 48 fast on the shaft. It is thus seen that each upward movement of the lever 44 will induce a partial turn of the star-wheel series 43 to feed a tube. A series of agitators for the tubes in the lower portion of the hopper is indicated at 49, these being mounted on a shaft 50 carried by the hopper, and this shaft being operated from the star-wheel shaft 42 by a chain drive 51. The tubes 41 are intended to drop onto a conveyor which is represented by the top runs of a pair of laterally spaced chains 52 located between the frame plates 31 and 32. The drive for the conveyor chains originates with an electric motor 53 secured on the base plate 30. A belt drive 54 rises from the motor to a pulley 55 carried by a frontal shaft 56, the latter being supported in bearings 57 extending rearwardly from the plate 33. The shaft 56 carries a worm 58 meshed with a vertical gear 59 located above the same. The gear is mounted on a long shaft 60 journaled in the plates 33 and 34, this being the main shaft of the machine. Near its end, the shaft 60 carries a worm 61, which is in mesh with a gear 62 below the same, such gear being fastened on a shaft 63. The latter is journaled in a bearing 64 carried by a rear plate 34 and a bearing 65 carried by the plate 31. The inner end of the shaft 63 carries a crank 66 which is attached to a link 67 extending forwardly to a point near the front of the machine. Here the link 67 is pivoted at 68 to the lower end of a lever 69.

The conveyor chains 52 are mounted on sprocket wheels 70, the latter being carried by cross shafts 71. These are supported at the ends by eccentric bearings 72, these being mounted in boxes 73. The bearings carry levers 72a connected by cross bars 72b and links 72c for the partial rotation of the bearings to adjust the conveyor. The frontal shaft 71 carries a ratchet wheel 74, and the lever 69 is enlarged at its upper end as indicated at 75 and freely mounted on the frontal shaft. The enlargement 75 of the lever carries a pawl 76 adapted to engage the ratchet wheel 74 and move the same over the distance of a tooth every time the lever swings back from the pull of the link 67. The conveyor is thus advanced a corresponding distance in the direction of the arrows in Fig. 5. The conveyor chains carry pairs of receptacles 77 in a longitudinally spaced series, and the stopping points of the conveyor are calculated to cause a pair of the receptacles 77 to be located directly under the outlet of the hopper 40 each time a tube 41 is dropped therefrom, so that the receptacles may take up the tubes in a going series as indicated in Figs. 5 and 7. The level of the conveyor is maintained by rails 52a over which the receptacles ride, the rails being carried by brackets 52b mounted on the shafts 71, as indicated in Fig. 4.

Figure 1A:
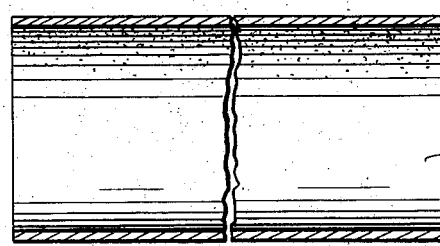
Figs. 1a to 1f are fragmental sections of the pasteboard tube, showing steps in its formation.
Figure 1D:
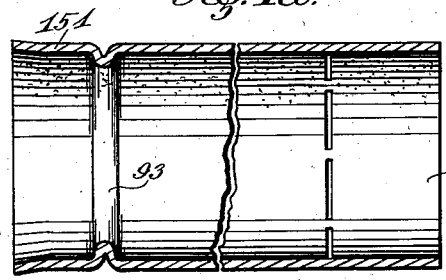
Figure 1B:
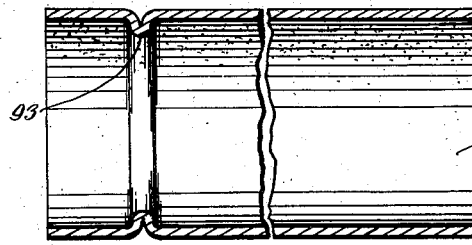

As the tubes are carried forward by the top run of the conveyor, it is intended that the left-hand portion of each tube—as seen from the front or in Figs. 3 and 4—receive a crimping impression near the end effective to create an internal annular bead. For this purpose a unit shown more clearly in Figs. 9 and 10 is employed. The frame of the particular unit is indicated at 80, and it is rigidly carried by a rearward extension 81 of a table 82 mounted on the machine top 37. It will suffice at this time to state that the table 82 undergoes short periodical movements inwardly of the machine, and Fig. 9 shows the particular unit advanced in accordance with the inward position of the table. The unit has a horizontal bearing 83 for a spindle 84 which carries a pulley 85 receiving a continuous belt drive 86 from a point below. The spindle 84 protrudes from the inner side of the bearing 83 to receive a spring-backed sleeve 85a and assume the form of an annularly grooved head 84a. The bearing 83 has a pair of rearward brackets 87 carrying a shaft 88. A frame 89 is pivoted on the latter, one end of the frame occurring directly over the bearing 83 and terminating with a similarly positioned bearing 90. A spindle 91 is journaled in the bearing 90 and carries a roller 92 tapering to its periphery directly above the groove of the head 84a. Fig. 9 shows a tube 41 positioned for treatment by the beading unit, and it may be assumed that this unit has moved toward the right to position the head 84a of the spindle 41 inside the tube, and the sleeve 85a acting as a shock-absorbing stop against the end of the tube. Since the head 84a is in continuous rotation, the depression of the bearing 90 to impress the roller 91 in the tube will induce both the rotation of the tube and of the roller so that the latter will impose an external groove in the tube defining an internal bead 93. The change just made in the tube 41 of Fig. 1a is indicated in Fig. 1b. The frame 89 is clamped on the shaft 88 as indicated at 89a and extended beyond the pivot with an arm 94 receiving motion from a drop link 95 having a vertical reciprocatory movement. It is understood that when the bead has been formed, the table 82 will receive a backing movement to withdraw the spindle 84a from the tube and permit the latter to proceed on the further movement of the conveyor.

The next treatment of the tube involves the opposite end thereof, that is, the right-hand end as seen in Fig. 4. As previously mentioned, a circular series of slits or perforations is made a short distance before this end. The purpose of these slits or perforations can be understood when the particular end of the tube is considered as an open or receiving one when the caps are deposited therein. Thus, the caps may be inserted or stacked to the extent of the series of slits or slightly beyond them, after which operation the particular end of the tube is folded inwardly or otherwise treated to close it and form a bar for the escape of the caps. Now, when a tube treated as explained is received at the dairy, the series of slits near the end to be opened makes it easy to tear such end open for the quick removal of the caps, whereas without the slit formation a tearing effort would loosen or unwind the spiral formation of the tube and risk the escape or loss of caps. The choice of the particular tube is of course determined from the marking of the caps visible through the opposite or bottom end of the tube, as was previously explained.

A unitary mechanism is employed for imposing the slit formation in the tube, such mechanism being more clearly illustrated in Figs. 4 and 15 to 19. Since the right-hand end of the tube is now treated—as seen in Fig. 4—the mechanism for this purpose is located at the corresponding side of the machine. Here the top 37 receives a frame 100 which carries a pair of laterally-spaced rods 101 which are intended to form ways for the sliding movement of a carriage 102. The latter has a bearing 103 in which is rotatable a spindle 104 having a rotary anvil disc 105. The bearing 103 is extended upwardly with a pair of arms 106 on which are medially pivoted at 107 a pair of brackets 108 supporting a bearing 109 parallel to the bearing 103. The brackets 108 are joined by a frame 110 which has an outward arm 111 to which is pivotally connected at 112 a pendent lever 113. In the bearing 109 is journaled a spindle 114 which carries a toothed wheel 115 at a point directly above the anvil disc 105. Primarily, the latter is intended to be given periodical rotary movements while within the related end of a pasteboard tube 41, as seen in Fig. 16. The anvil disc 105 and the toothed wheel 115 are operatively connected by a pinion 116 on the spindle 104 meshing with a gear 117 carried on a shaft 118 from which the arms 106 are extended. The gear 117 in turn meshes with a gear 119 free on the rock shaft 107, and the gear 119 finally meshes with a pinion 120 on the spindle 114. The anvil disc 105 and the toothed wheel 115 thus rotate in opposite directions; and when the lever 113 is raised, the toothed wheel 115 descends to cut the slits in the tube 41 and overlap the disc 105 in the manner of a shear, making the slitting operation thorough.

It is intended that the disc 105 and the wheel 115 receive joint rotary movements approximating two revolutions at intervals, the object being to impose only a sufficient slitting operation and not to continue the same to the extent of unduly weakening or possibly severing the tube. In order to induce the movement referred to, the outer end of the shaft 118 carries a free pulley 121 operated by a belt 122 from a power source below. The gear 117 is carried by a drum 123 whose outer end is proximate to the inner face of the pulley 121. Such face has an inwardly projecting pin 124, and the drum 123 has a series of long but similarly located pins 125, these pins having lugs 125a in the expanding path of the springs 126 to urge the pins 125 in the direction of the pulleys 121. Each pin 125 is cut with a notch 125b on the outer side; and when the drum turns to locate a pin 125 at the bottom as shown in Fig. 17, the notched portion of the pin rides upon an oblique cam 127 projected from a cross bar 128, the action of the cam being to hold the pin in retracted position relative to the pulley 121. The latter is in constant rotation, and the projection of any pin 125 from the drum 123 will place such pin in the path of the rotating pin 124 of the pulley 121 with the effect of driving the drum around with the same. This would be continuous except for the action of the bar 128, which is pivoted at one end to the rear rod 101 and linked with the other end as indicated at 129 to a depending lever 130. Thus, when the latter is raised, it imposes the cam 127 upon the first descending pin 125 to draw the latter out of the path of the revolving pin 124. Thus, the periodical rotation of the drum 123 is procured by the periodical descent of the bar 128 to the dotted line position of Fig. 18 for a sufficient time to expose a given pin 125 to one revolution of the pulley pin 124. The provision of three pins 125 lends the drum 123 a quick drive from the pulley 121.

Figure 1E:
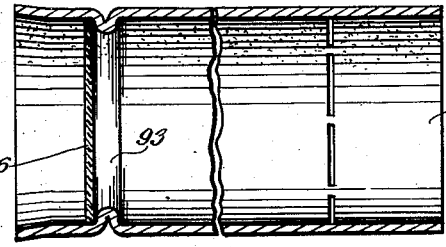
Figure 1C:
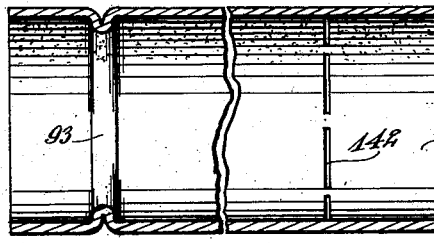

As was the case with the beading unit on the opposite side of the machine, an action is induced to advance and withdraw the slitting unit relative to the tube 41. This action is the sliding of the entire unit—supported by the carriage 102—along the companion rods 101 within prescribed limits. The sliding of the carriage is determined by the longitudinal reciprocatory motion of a lever 131. As seen in Figs. 4 and 16, this lever is linked at 131a near the upper end of a quadrant arm 132 pivoted with its lower end at 132a to the frame plate 38. To the quadrant arm is pivoted at 133 the lower end of a bar 134 which rises to make an adjustable connection 135 in the quadrant slot 136, and continues to be pivoted at 137 to a cross link 138 which is pivoted with its other end at 139 to a pair of lugs 140 depending from the carriage 102, as more clearly indicated in Fig. 15. It will be evident that the movement of the lever 131 will induce the reciprocatory sliding action on the carriage 102, and that the adjustable connection at 135 enables the carriage to be set at any point along the rods 101 which is most suitable for the proper action of the carriage in relation to the tube 41. It follows now that the carriage 102 will be in the outer or retracted position as the tube 41 reaches a point opposite the anvil disc 105, and that the carriage will advance to insert such disc as shown in Fig. 16 during the interval when the tube is at rest, the rotary action of the anvil disc and the toothed wheel above it occurring at such time in the manner previously described. Incidentally, the lever movement to retract the carriage is positive, while a spring 141 is used to draw on the quadrant arm 132 to induce the advance of the carriage. Thus, the tube as just treated will appear as in the section of Fig. 1c, the slitted formation being indicated at 142.

With the tubes moving forward with the conveyor, the balance of treatments thereto are limited to the first-mentioned ends thereof, that is, those on the left-hand side of the machine as seen from the front. The next operation on the tube anticipates insertion of the Cellophane window against the bead 93, paving the way for the same. Specifically, this action requires the flaring of the related end of the tube for facility in inserting the Cellophane window, and the unit for the flaring operation is more clearly illustrated in Figs. 5, 6, 9 and 11. Here it is seen that a horizontal chain drive 145 is led from a sprocket 146 on the beading spindle 84 to a sprocket 147 carried by a spindle 148 journaled in a bearing standard 149 mounted on the table 82. The spindle 148 is thus in constant rotation, and its inner end carries a plug-shaped circular head 150. As was previously mentioned, the table 82 undergoes periodical transverse movements in inward and outward directions, and the conveyor is designed to bring each tube 41 in line with the spindle head 150 at a time when the latter is in the retracted position. Now, the advancing movement of the table pushes the head 150 into the open end of the tube, flaring the same as indicated at 151 in Figs. 11 and 1d.

The unit for the application of the Cellophane window will now be described, the same being mainly illustrated in Figs. 3, 12 and 13. The table 82 carries an upstanding frame plate 155 which takes a lateral course outwardly as seen from the front of the machine. The extreme end of the plate 155 carries a supply roll 156 in freely rotatable relation, the Cellophane tape 157 being drawn from the same over a fixed idler unit 158, then under a spring drawn idler unit 159, then under a second fixed idler unit 160, and finally over a rubber surfaced roller 161. As indicated in Figs. 4 and 12, the tape descends between a receptacle 162 and a cylindrically-bored box 163, the receptacle being of a capacity suitable to fit over the flared end of the tube 41 which may become alined with it as shown in Fig. 12. The box 163 receives the receptacle 162 by means of securing bolts 162a and is mounted on the table 82, so that it periodically recedes and advances with the same relative to the tube. The box 163 contains a slidable plunger 164 which carries a blanking die 165 at its inner end. Thus, the inward table movement of the box 163 is utilized to advance the receptacle 162 to fit over the tube 41 as the conveyor alines the same with the receptacle, while the advance of the plunger 164 is independently induced to punch a section 166 from the Cellophane tape 157 and deposit same against the bead 93 as shown, so that the window in the corresponding end of the tube 41 appears as indicated at 166 in Fig. 1e.

The action of the plunger 164 is obtained by the use of a pair of knuckle-links 167 originating from a pair of table posts 168. Full lines in Fig. 3 and dotted ones in Fig. 12 show the knuckle-links raised by virtue of the upward push of a lever 169 to retract the plunger 164, while full lines in Fig. 12 show the links straightened to advance the plunger when the lever 169 descends. It may now be mentioned that the rise of the lever 169 is positive, while the descent thereof is induced by the pull of a spring 170 on one of the links 167, the lower end of the spring being connected to the angle bar 35 after passing through openings 82a and 37a in the table 82 and top 37, respectively.

In order that a supply of the Cellophane tape may be continually furnished for the treatment just described, a power feed for the roller 161 is provided. This feed originates with a rising lever 175 which makes an adjustable pivotal connection 176 with a radial arm 177 pivoted on a shaft 178 journaled in a frame plate bearing 155a. The arm 177 carries a ball clutch block 179 freely mounted on the shaft 178. The drum and the roller 161 are fast on the shaft 178. Thus, the rising movement of the lever 175 induces the rotation of the drum and roller in the direction indicated by arrows in Figs. 12 and 13; and a pressure roller 181 is provided against the frontal side of the Cellophane tape 157 to steady its feed, the roller 181 being carried by a frame 182 pivoted at 183 to the frame plate 155. The frame 182 has an adjustable spring setting 184 extending from a frame plate post 185 to maintain pressure on the roller 181.

A cut-off for the bottom remnant of the Cellophane tape 157 is provided in the form of a beveled knife 190 below the cylinder 163. The knife is carried by a bracket 191 from the machine structure plate 31, and the cutting operation is effected by the movement of the box 163 relative to the knife, the latter carrying a backing spring 192 to cushion the action. It may be mentioned at this point that the advancing movement of the box 163, which is also that of the table 82, is not positive, but by the action of a spring 193 below the angle plate 36. This spring draws on a lever 194, which is in turn connected to a drop lug 195 of the table by a cross link 196.

Figure 1F:
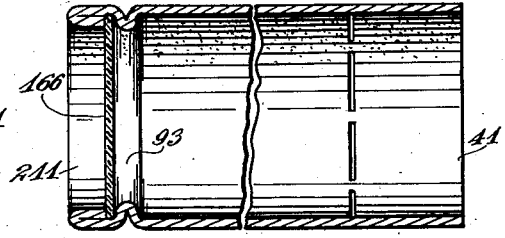

The unit for the final treatment of the tubes 41 will now be described. Figs. 4 and 14 show a frontal bearing standard 200 whose base is secured on the table 82 by bolts 201 or other suitable fastening means. The standard 200 journals a horizontal shaft 202, one end of which carries a pulley 203 which is operated continuously by a belt 204 leading from a power source below. The opposite end of the shaft 202, which is inwardly directed, is formed with a head 205 which has an annular cavity 206 with a restricted entrance opening 207 facing the path of the tubes 41. A set of four peripherally grooved rollers 208 is distributed in a circular series in the cavity 206, the rollers being free to rotate on screws 209 driven into the center stock of the head 205. The outer stock thereof is formed with openings 210 for the application of the screws after the rollers have been mounted thereon. The foremost tube 41 is designed to have a stopping point opposite the head 205, and when the table 82 takes an inward movement, the rotating head 205 advances on the related end of the tube 41 in the manner of a die, the action of the rollers 208 causing the end portion of the tube to fold inwardly upon itself as indicated in Fig. 14. The length of the end portion is so calculated as to cause the internal fold 211 to meet the Cellophane window as a result of the infolding operation, so that the window becomes locked in place and the corresponding end of the finished tube appears as in Fig. 1f. The outer wall of the head 205 has extra openings 206a for the dissipation of heat generated by the frictional operation of the rollers 208.

While the tubes 41 may retain their position on the conveyor during the progressive movement of the same, it is essential that such tubes as receive the forming treatments be held steady against rotation or vibration during the treatment intervals. Thus, a series of three hold-down units 215 are projected over the tubes receiving the beading, slitting and window-inserting operations. The units 215 are in the form of downbent rods projecting inwardly of the machine from clamps 216 secured on a rock shaft 217. The lower ends of the rods carry cushion blocks 218 of rubber or other material in contact with the top portion of the affected tubes. A crank 219 at the rear end of the shaft 217 is adapted to receive periodical movements to raise and lower the hold-down units 215 through the agency of a pendent lever 220 which has a vertically reciprocating motion. It is understood that the hold-down units 215 are raised during the progress of the conveyor and drop during every stopping point thereof.

Two more hold-down devices are provided, one being a rod 221 extending from a clamp 222 mounted on a rock-shaft 223 which is situated some distance below the rock-shaft 217. The rod 221 carries a bottom cushion 224 over the tube 41 which is opposite the flaring unit 149; and the rock-shaft 223 has a crank 225 at its rear end which has a function similar to the crank 219 in response to the movement of a control lever 226. Both rock-shafts are journaled in the bearings 227 and 228 rising from the frame of the machine. The other hold-down device carried by the rock shaft 223 comprises a bracket 229 free on the rock-shaft and adjusted in a downward direction by a set screw 230 threaded through a clamp 231 secured at 232 to the rock-shaft. The bracket 229 carries a substantially horizontal bar 233 which extends in a position directly behind and over the foremost tube 41, carrying a pair of hold-down blocks 234 which rest on the tube. The clamp 229 is thus adjustable to impart a desired amount of pressure on the tube to resist the rotative infolding action of the unit 205. Also, freely-rotatable backing discs 234a are provided for tubes which rotate under treatment.

Most of the operative units of the machine receive their motion from the main shaft 60. Thus, as is clearly indicated in Figs. 5 and 22, the lever 44 which controls the dropping of the tubes 41 from the hopper 40 is provided with a roller 235 at the bottom which rides on a cam 236 carried by the shaft 60. The roller 235 is kept in position over the cam by a link 237 which is pivoted at 238 from a bracket 239 extending from the frame plate 31.

By reference to Figs. 5 and 23, it will be noted that the lever 220 is next in line. This lever descends alongside a cam 240 carried by a shaft 60, placing a roller 241 under the cam so that the latter has a downward influence on the lever. The upward pull on the same is exerted by a spring 242 which thus renders the action of the hold-down units 215 yieldable. The lever 226 is seen near by and also in Fig. 24, and this lever is applied in a manner similar to the lever 220 in respect to a shaft cam 243 by means of a roller 244 and a draw spring 245. The springs 242 and 245 are secured to the frame plate 31 of the machine.

Figs. 5 and 25 show a cam 246, which follows the cam 243. The cam 246 is employed to control a roller 247 carried by the bottom of the lever 95 which controls the beading unit 83 of Figs. 9 and 10. A spring 248 draws upwardly on the lever 95, whereby to make the descent and application of the roller 92 yieldable.

Figs. 5 and 21 show the unit next in line. The same consists of a cam 250 mounted on the shaft 60 and receiving a roller 251 from beneath. The roller is carried by a bell crank lever 252 pivoted intermediate its ends to a bracket 253 of the frame plate 31. The inner end of the lever receives a long rod 254 which extends across the machine to one arm of a bell crank lever 255 carried by the frame plate 32, as seen in Fig. 4. The other arm of the bell crank 255 is connected to the lever 113 which operates the slitting device shown in Figs. 15 to 19.

The next unit in line is a cam 260 mounted on the shaft 60 and more clearly shown in Fig. 20. It is seen that the cam 260 receives a roller 261 from a bell crank lever 262 in the same manner as the unit just previously described, to make connections with a cross rod 263 extending to the opposite side of the machine to connect with one arm of a bell crank lever 264, the other arm thereof being connected to the lever 130 which controls the slitting device of Figs. 15 to 19. It will be noted that the rods 254 and 263 receive draw springs 265 and 266 from the frame plate 32, whereby to control the slitting mechanism by spring action.

The unit next in line is represented by a cam 270 mounted on the shaft 60. As indicated more clearly in Fig. 26, a follower roller 271 is mounted inwardly of the cam on a link 272 carried by a bracket 273 of the frame plate 31, the upper end of the link making connection with the cross lever 131 which operates the carriage 102 of the tube slitting unit, as illustrated in Figs. 4 and 16.

Figs. 5 and 27 show the unit next in line, and of which a partial illustration on a large scale is evident in Fig. 12. A cam 275 in this unit is mounted on the shaft 60 and receives a follower roller 276 from below. This roller is carried by a link 277 extending from a bracket 278, the outer end of the link connecting with the lever 175 which actuates the Cellophane tape feed device shown in Figs. 12 and 13. As noted, a draw spring 279 connected to the lever 175 is employed to induce the feed.

Figs. 5, 28 and 12 show the means for moving the table 82 and box 163. A cam 280 is shown mounted on the shaft 60 and receiving a follower roller 281 from behind. This roller is carried by the link 194 previously described which is connected to the table by the parts 196 and 195. As mentioned before, the spring 193 is employed to induce the advancing action of the table.

The next unit in line involves a cam 285 mounted on the shaft 60 and receiving a follower roller 286 from above. This roller is carried by a link 287 from a frame plate bracket 288, as more clearly shown in Figs. 12 and 29. The link 287 is connected to the link 169 which extends upwardly to the joint of the knuckle links 167. It is noted that the draw spring 170 is connected to one of these in order to straighten the knuckle links and induce the feed of the plunger 164 by spring action.

While the motor 53 is the main power source of the machine through the transmission of its motion to the shaft 60, a different power source is used for the units which require greater speed, such source being in the form of a secondary motor 290 mounted on a platform 291 which is pivoted at 292 to a bracket 293 of the frontal frame plate 33. The motor 290 carries a pulley 294 from which a belt 295 extends rearwardly to a pulley 296 mounted on a shaft 297 which extends crosswise to the opposite side of the machine and receives a key-way 298 in its remote portion, the shaft being journaled in bearings 299 and 300 carried by the frame plates 31 and 32, respectively. The proximate portion of the shaft carries a pulley 301 which receives the belt 86 from the pulley 85 of the beading unit illustrated in Figs. 9 and 10. At the farther end of the shaft 297 is a sliding pulley 302 which receives the belt 122 from the pulley 121 of the unit shown in Figs. 15 to 19, it being understood that the movement of the carriage 102 requires the belt 122 to be shiftable and therefore requiring the sliding disposal of the pulley 302. However, the movement of the carriage 102 is relatively short, so that no undue strain or deviating influence is imposed on the belt 122 or the levers 113 and 130. The motor 290 also carries a pulley 303 which receives the belt 204 from the pulley 203 of the inturning unit illustrated in Fig. 14. The pivoted support 292 of the motor 290 permits the weight of the motor to take up slack in the belts 204 and 295.

Fig. 6 shows the application of a handwheel 304 to the shaft 56 for facility in momentarily operating the machine when the power is off.

It will be evident from the structural and functional characteristics of the machine described above that the basic action of the same is to alternate the advance of the pasteboard tubes with operative actions thereon, the tubes being at rest while such operations are performed. At the same time, the advance of the operative units upon the tubes is synchronized with the motion of the running gear in a manner to function when the tubes are at rest and recede while they take the next advancing movement. Thus, when the machine is viewed in action, a concerted movement from opposite sides in the inward direction is noted while the tubes are at rest and a similar outward movement releases the tubes for the advance. Considering that both of these movements involve a plurality of units controlled from the zone of the main shaft 60, it is appreciated that such zone concentrates the controls of the several operative units in a compact and concealed space below the table of the machine, so that the transmission of motion to the various units is not spread out or unduly complicated. Further, as has been specified in several instances, the motion to the operative units is transmitted through springs, so that the units may yield slightly if necessary to imperfections or inequalities in the work or positions thereof, making the operations on the tubes yieldable instead of rigid or positive. Considering the miscellaneous functions performed in the machine, it may be said that only such parts or instrumentalities are involved therein as are necessary to perform the said functions, and that the said parts and instrumentalities are designed along lines of simplicity and in keeping with accepted machine practice. An assembly is thus had which is sturdy, well balanced and durably constructed to serve its intended purpose.

While we have described the improved machine along specific lines, it is apparent that minor changes or refinements may be made therein without departing from its principle, and we desire to consider such changes and refinements as coming within the scope and spirit of the appended claims.

We claim:

1. A machine for imposing formations in the end portions of pasteboard tubes comprising a conveyor adapted to receive the tubes in succession at the rear of the machine and to transport them in a forward path, the tubes extending cross-wise of the latter, a series of operative units along one side of the machine to impart internal beading, window inserting and end-infolding formations on the related end portions of the tubes as these progress with the conveyor, and a unit operative along the other side of the machine to impart an annular slitting formation on the related end portions of the tubes, said internal beading, window-inserting and end infolding units having joint means for their application, a major power source controlling said means, said internal-beading, end-folding and slitting units also including constantly rotating implements effective on the application of the units, and an independent power source for such implements.

2. A machine for imposing formations in the end portions of pasteboard tubes comprising a conveyor adapted to receive the tubes in succession at one end of the machine and to transport them with a stop motion toward the other end of the machine, a series of operative units at the sides of the conveyor and geared in synchronism with the same to impose said formations during the stopping periods of the tubes, a series of hold-down elements operable downwardly to engage the tubes receiving the formations, and means geared in synchronism with the conveyor to permit said hold-down elements to be effective during said stopping periods of the tubes to hold them in fixed positions, said means being operative to raise such hold-down elements clear of the tubes while these are in motion.

RUDOLPH SONNENBERG.
IRVIN L. YOUNG.

REFERENCES CITED

The following references are of record in the file of this patent:

UNITED STATES PATENTS

| Number | Name | Date |
|---|---|---|
| 1,038,715 | Beadle | Sept. 17, 1912 |
| 1,873,254 | Angell | Aug. 23, 1932 |
| 1,922,189 | Angell | Aug. 15, 1933 |
| 2,090,448 | Jahne et al. | Aug. 17, 1937 |
| 1,254,207 | Cullen | Jan. 22, 1918 |
| 2,324,572 | Frederick et al. | July 20, 1943 |